J. WILLMANN.
PASTEURIZING APPARATUS.
APPLICATION FILED APR. 18, 1912.

1,210,578.

Patented Jan. 2, 1917.
3 SHEETS—SHEET 3.

Witnesses:

Inventor
Joseph Willmann
by James L. Norris
Atty.

UNITED STATES PATENT OFFICE.

JOSEPH WILLMANN, OF DERBY, CONNECTICUT.

PASTEURIZING APPARATUS.

1,210,578. Specification of Letters Patent. Patented Jan. 2, 1917.

Application filed April 18, 1912. Serial No. 691,602.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented new and useful Improvements in Pasteurizing Apparatus, of which the following is a specification.

The present invention relates to improvements in apparatus for pasteurizing milk and other liquids, and the primary object of the invention is to provide improved apparatus for receiving the milk or liquid while heated to a pasteurizing temperature, holding the heated liquid at the said temperature with certainty for a period of time sufficient to kill or render harmless the bacteria, particularly the pathogenic organisms therein, and for discharging the liquid after being so held, the holding apparatus, according to the present invention, embodying heating means which serves to prevent a reduction in the temperature of the liquid or for raising the temperature of the liquid while being held, whereby the pasteurizing operation is rendered more effective, agitators are provided for the liquid whereby uniformity in the pasteurizing operation is insured, and the liquid is conducted to and from the holding tanks or receptacles through the bottom or lower portion thereof, thereby avoiding the formation of foam in the tanks.

To these and other ends, the invention consists in certain improvements, and combinations and arrangements of parts, all as will be hereinafter more fully described, the novel features being pointed out particularly in the claims at the end of the specification.

Figure 1:
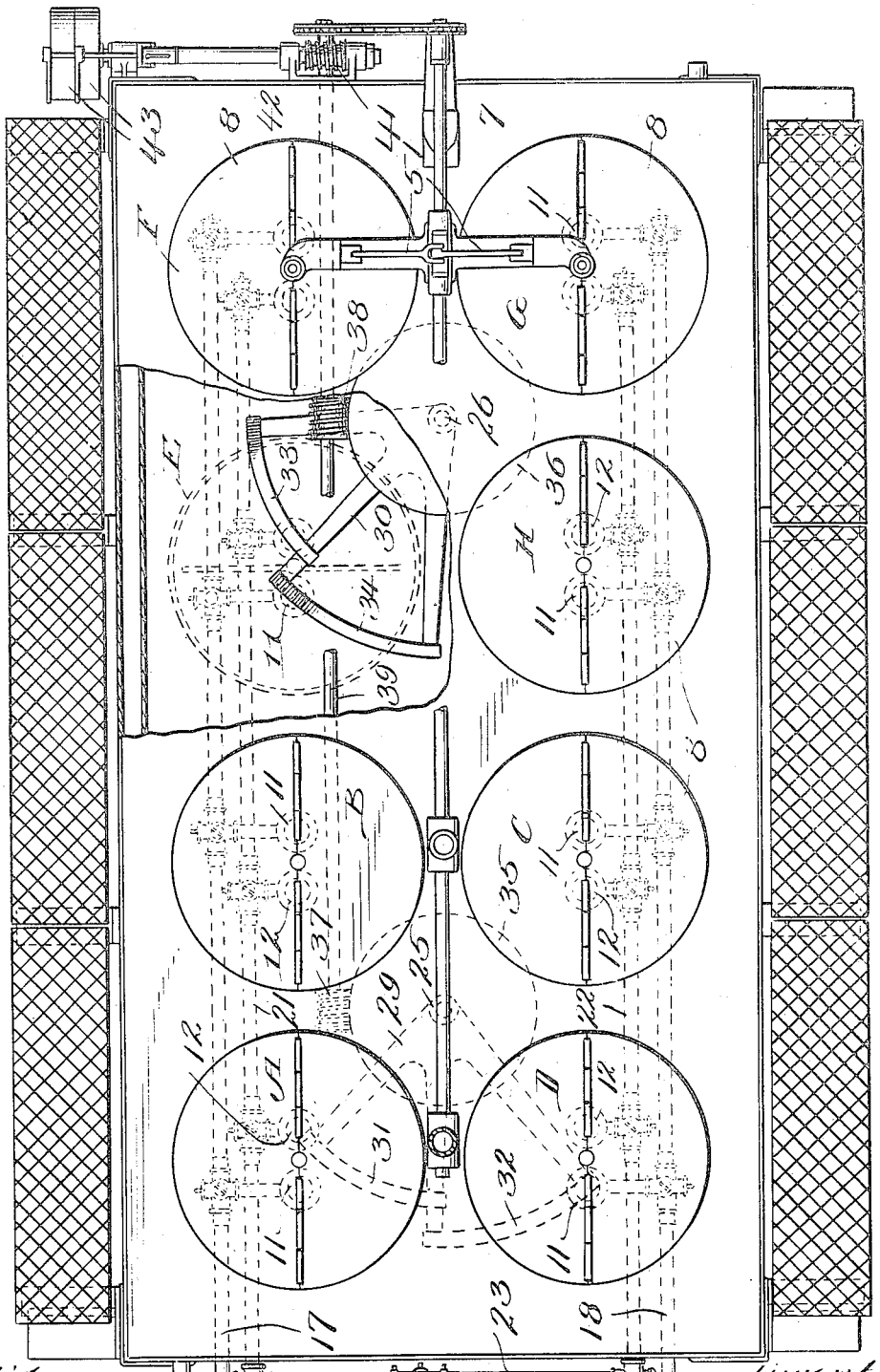
Figure 2:
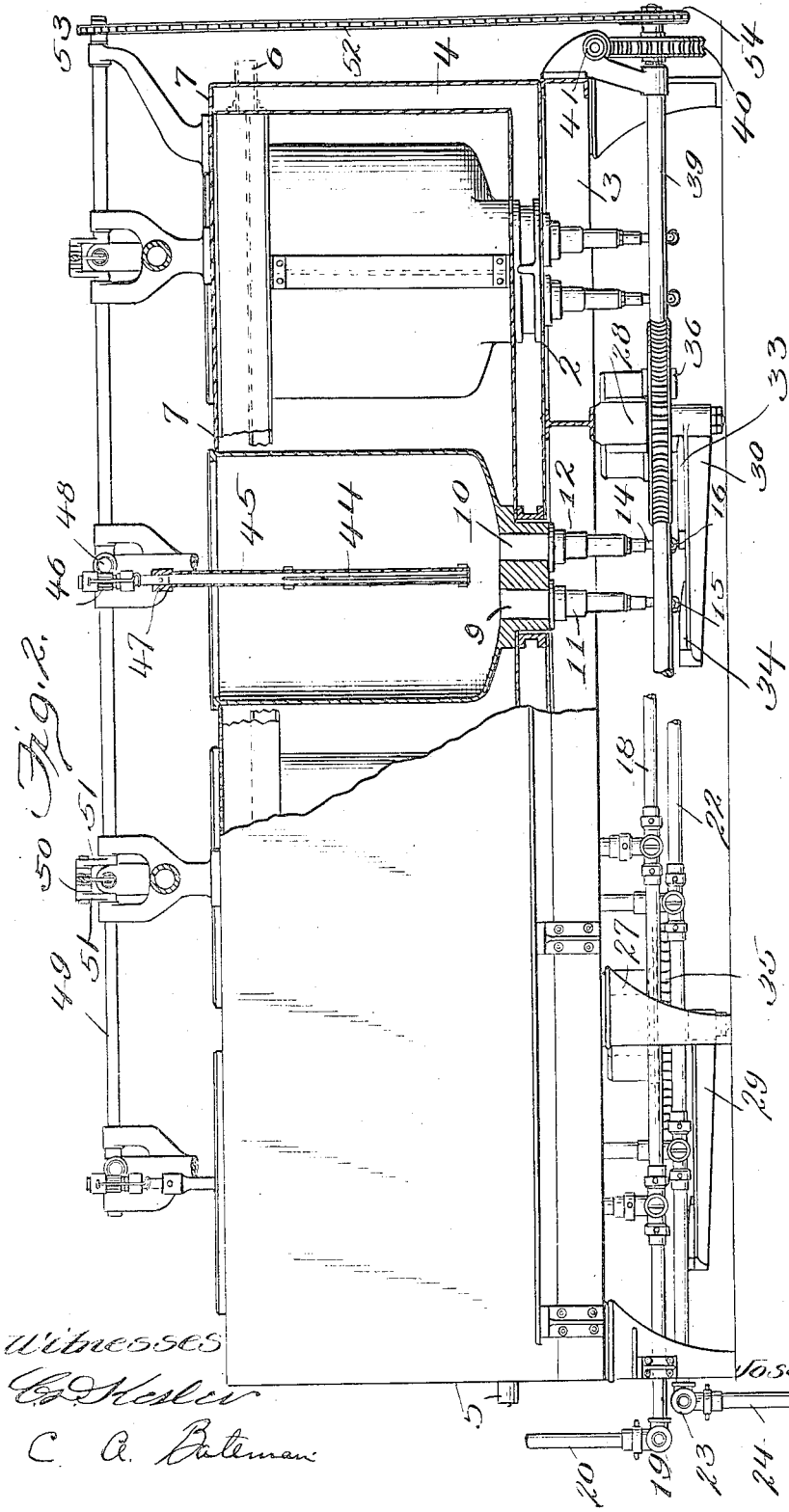
Figure 3:
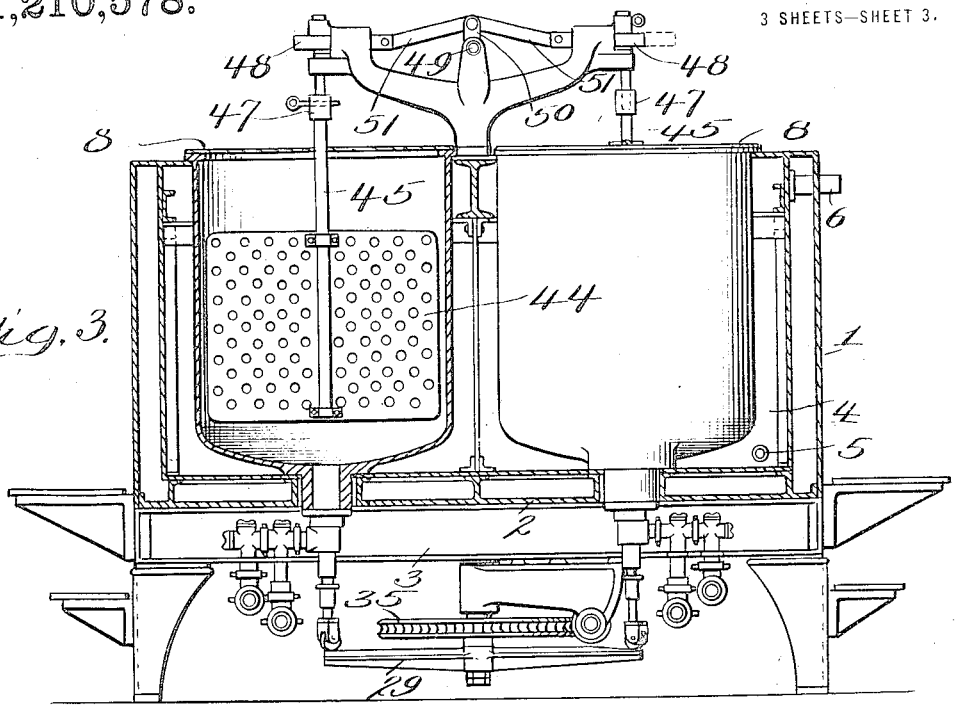
Figure 4:
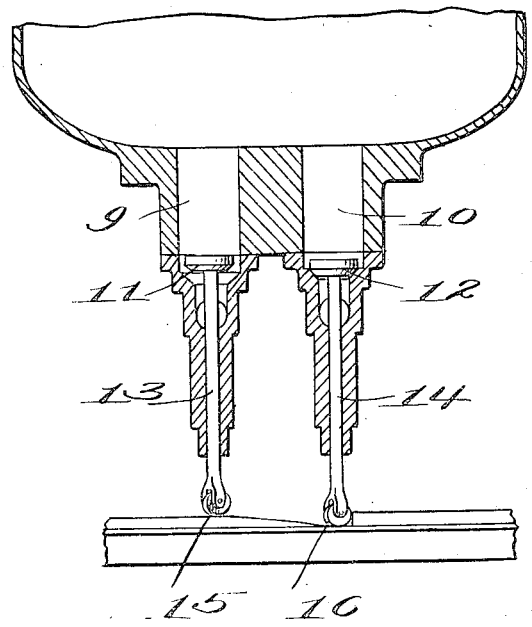

In the accompanying drawing:—Figure 1 is a top plan view of holding apparatus constructed in accordance with the preferred embodiment of the invention, a portion of the apparatus being broken away; Fig. 2 is a side elevation, partly in section, of the apparatus as shown in Fig. 1; Fig. 3 represents a transverse section through the apparatus; and Fig. 4 is a detail view of the valve mechanism for one of the tanks or receptacles.

Similar parts are designated by the same reference characters in the several views.

Holding apparatus embodying the present invention is particularly adapted to be used in connection with a heater or pasteurizer which raises the temperature of the milk or liquid to a suitable point before the liquid enters the holding apparatus, and suitable cooling apparatus which reduces the temperature of the milk or liquid after being treated in the holding apparatus. Heaters or pasteurizers and cooling apparatus suitable for use in connection with holding apparatus embodying the present invention are well known in the art and, hence, they will not be described in the present instance, although it is to be noted that the holding apparatus embodying the present invention is capable of continuously receiving the milk from the heater or pasteurizer and continuously discharging it into the cooling apparatus. The preferred embodiment of the invention is shown in the accompanying drawing and will be hereinafter described in detail, but it is to be understood that the invention is not limited to the specific construction shown and described, as modifications and changes may be made in adapting the invention to the conditions or requirements of each particular case.

In the construction shown, the apparatus embodies an outer tank 1 which is closed at the sides and ends and also has a closed bottom 2, this tank resting on a suitable base 3 and it provides a space or chamber 4 which is adapted to contain a heating medium, preferably water. This heating medium is maintained at the proper temperature by steam pipes 5 or other appropriate heating means, and the condensation water is conducted away by an overflow pipe 6 which serves to maintain the heating medium in the tank 1 at a proper level and avoids overflowing of the tank.

It is preferable to treat the milk or liquid to be pasteurized by conducting the milk successively into a plurality of tanks or receptacles and discharging the milk successively from such receptacles, the order in which the tanks or receptacles are filled and emptied, and the duration of exposure of the milk in each receptacle being so timed that all portions or bodies of the milk or liquid will be held uniformly at a proper pasteurizing temperature and for a uniform period which will be sufficient to kill or render harmless the harmful bacteria. For example, a set of eight tanks or receptacles may be used forming one group of tanks A, B, C and D and another group of tanks E, F, G and H, the tanks of each group being conveniently arranged symmetrically and these tanks which are adapted to contain the liquid to be treated are immersed in the heating liquid or medium contained in the outer tank 1. The outer tank is preferably provided with a cover 7 which has openings to accommodate the different tanks or receptacles which are contained therein, and the tanks or receptacles which are to receive the liquid to be treated are preferably provided with hinged or movable lids 8 which facilitate access to or inspection of the interiors thereof. In the present instance, the bottom of each tank or receptacle for the liquid to be treated is provided with an inlet 9 and an outlet 10 for such liquid, the inlet and outlet being controlled by valves 11 and 12 respectively, and these valves are opened by push rods 13 and 14 respectively which are preferably provided with anti-friction rollers 15 and 16. A pair of manifolds 17 and 18 are provided which are connected to the inlet valves 11 of the tanks A, B, E and F, and C, D, G and H respectively, and these manifolds are connected by the header 19 to a liquid supply pipe 20 which leads from the heater or pasteurizer. A similar pair of manifolds 21 and 22 are provided which are suitably connected to the outlet valves 12 of the respective rows of tanks, these manifolds being connected by a header 23 which discharges the liquid after being held in the tanks into a pipe 24 which leads, for example, to suitable cooling apparatus.

The apparatus shown is adapted to constantly receive and discharge the liquid through the pipes 20 and 24 respectively, and one form of mechanism is shown whereby this result may be accomplished. In the present construction, a pair of vertical shafts 25 and 26 are provided, the shaft 25 being employed for the group of tanks A, B, C and D and is preferably located centrally of the group, and the shaft 26 is provided for the group of tanks E, F, G and H and it is similarly located. These shafts may be suitably supported by brackets 27 and 28 which in the present instance are fixed to the under side of the base. The shafts 25 and 26 carry cams 29 and 30 respectively, the cam 29 having a cam track 31 thereon which is adapted to successively engage the rollers 16 and thereby open the discharge valves 12 of the group of tanks A, B, C and D, and this cam also has a cam track 32 which is arranged to successively lift the rollers 15 and thereby open the inlet valves 11 for said group of tanks, the cam track 31 which opens the outlet or discharge valves being arranged in advance of the cam track 32 which opens the inlet valves of these tanks, and these cam tracks are so positioned and related that the outlet or discharge valve of one tank will be opened to discharge the contents thereof and after the contents of the tank have been discharged, the outlet valve is caused to close and the inlet valve of said tank opens to recharge the tank with liquid to be treated. In the present instance, the parts are so arranged that the cam track 32 will permit the inlet valve of one tank to close whereupon the cam track 31 opens the outlet or discharge valve of the next tank in advance thereof. The cam 30 for the group of tanks E, F, G and H may be a duplicate of the cam 29, it having cam tracks 33 and 34 to operate successively and in predetermined order upon the discharge and inlet valves of the group of tanks E, F, G and H in the manner described in connection with the group of tanks A, B, C and D, but the cam 30 is timed to operate upon its respective group of tanks in advance of the operation of the cam 29 on its group of tanks A, B, C and D, whereby there will always be one tank of the set receiving the liquid to be treated and another tank of the set discharging the liquid after being treated, with the result that the liquid may flow continuously to the apparatus from the heater or pasteurizer and it may flow continuously from the holding apparatus to the cooling apparatus. In the present construction employing eight tanks, the cam 30 is set 45° in advance of the cam 29 whereby the cam track 31 will open the discharge valve of one tank, for example the tank A, immediately after the cam track 33 has permitted the discharge valve of the tank E to close, and the cam track 34 will open the inlet valve of the tank E at substantially the moment the cam track 32 permits the inlet valve of the tank D to close, this operation being repeated throughout the series.

The cams 29 and 30 may be operated in different ways although they should operate at uniform speed and in predetermined relation. In the present instance, the shafts 25 and 26 to which these cams are fixed are provided with worm wheels 35 and 36. Worms 37 and 38 coöperate with the worm wheels, and these worms are fixed on a common shaft 39 which may be journaled in the brackets 27 and 28, as shown, and said shaft is provided with a worm wheel 40 and a coöperating worm 41, the latter being fixed to a main drive shaft 42 which may be operated, for example, by the belt pulleys 43.

To insure uniform action of the heat throughout each body of milk or liquid contained in the respective tank, means is provided by the present invention for agitating the different bodies of milk or liquid while being held. In the construction shown, each agitator embodies a perforated plate 44 which conforms approximately to the diameter of the tank and is fixed to a vertical and centrally located shaft 45, this shaft extending through the lid 8 of the tank and is connected to a pinion 46, a detachable coupling 47 being preferably provided between these parts to facilitate removal of the agitator from the tank when desirable or necessary. One of these agitators is provided for each tank and there is one pinion 46 for each tank, each pinion being mounted in a suitable bracket and a reciprocatory rack 48 coöperates with each pinion and is guided to slide in the bracket. A common operating shaft 49 is provided for all the agitators in the present instance, this shaft extending longitudinally across the top of the apparatus and is provided with a set of cranks 50 which are connected by the pitman 51 to the different racks 48. The shaft 49 may be operated continuously by a chain or equivalent transmission means 52, the chain shown in the present instance coöperating with sprocket wheels 53 and 54 which are carried respectively by the shafts 49 and 39.

The inlet pipe 20 being connected to a pasteurizer or heater and the outlet pipe 24 to cooling apparatus, and motion being imparted continously to the drive shaft 42, the milk or liquid heated to the proper temperature flows continuously to the holding apparatus and will be conducted successively into the different tanks in a manner that will avoid interruption in the flow of the milk or liquid from the pasteurizer, and the milk or liquid is successively discharged from the different tanks after each body of milk has been held positively and in a manner to insure perfect pasteurization and to prevent over-exposure which would tend to harden the albumin and otherwise alter the characteristics of the milk, the discharge from the holding apparatus being continuous and, hence, the milk may flow without interruption through the cooling apparatus. The agitators in the different tanks rotate with a to-and-fro movement, thereby insuring uniform thermal condition throughout the extent of each body of milk, and the heating medium exterior to the tanks prevents loss of heat from the milk whether due to radiation or evaporation, whereby the different bodies of milk while being held are either maintained at a constant temperature, or preferably, the exterior heating medium is of a temperature which will raise the temperature of the milk while being held in the different tanks, the thermal activity maintained within each tank thus acting more effectively to destroy the bacteria and particularly the pathogenic organisms which have a relatively high resistive power.

An example of a complete pasteurizing apparatus employing the holding apparatus of the present invention is shown in my application executed of even date herewith.

I claim as my invention:—

1. Pasteurizing apparatus comprising a plurality of groups of tanks, means for each group operative to successively empty and fill each tank of the respective group, and operating mechanism for said means causing such means of each group to operate alternately.

2. Pasteurizing apparatus embodying a group of tanks each having an inlet valve in the lower portion thereof to conduct liquid to be treated to the tank, and an outlet valve also in the lower portion of the tank for emptying the same, and means for operating said valves to successively fill and empty the tanks of the group.

In testimony whereof I have hereunto set my hand in presence of two subscribing witnesses.

JOSEPH WILLMANN.

Witnesses:
 ROSE M. SEFTON,
 CLARENCE A. BATEMAN.